A. B. HOLLENBECK.
AUTOMOBILE TIRE.
APPLICATION FILED JUNE 8, 1910.

1,077,407.

Patented Nov. 4, 1913.

Witnesses
Daniel Webster Jr.
A. M. Kelly

Inventor
Albert B. Hollenbeck
By
Attorney

UNITED STATES PATENT OFFICE.

ALBERT B. HOLLENBECK, OF SIDNEY, NEW YORK.

AUTOMOBILE-TIRE.

1,077,407.

Specification of Letters Patent.

Patented Nov. 4, 1913.

Application filed June 8, 1910. Serial No. 565,827.

*To all whom it may concern:*

Be it known that I, ALBERT B. HOLLENBECK, a citizen of the United States, and a resident of Sidney, county of Delaware, State of New York, have invented an Improvement in Automobile-Tires, of which the following is a specification.

My invention has reference to automobile tires and consists of certain improvements which are fully set forth in the following specification and shown in the accompanying drawings which form a part thereof.

The object of my invention is to provide a construction of pneumatic tire which shall be so protected against puncture that it shall be suitable for heavy duty and rough usage without danger of destruction.

Aside from the use of my improved tire for pleasure vehicles, I have in mind its being most excellently adapted to the requirements of commercial wagons.

My object is also to provide a construction which shall provide a long life to the tire and to incorporate the elasticity of the pneumatic tire with the resistance of the cushion or solid rubber tire.

My invention consists of an inner pneumatic tire surrounded in a fabric and rubber case and seated in the groove of a fixed metal tire portion, and combined with an annular outer metallic tire portion internally grooved to receive and seat upon the case of the pneumatic tire and having its periphery provided with a solid or other form of rubber shoe, the construction being such that the weight of the vehicle and its load rides yieldingly upon the pneumatic tire while the outer metallic and solid rubber portion takes the hard wear upon the road and protects the pneumatic tire against being punctured.

Figure 1:
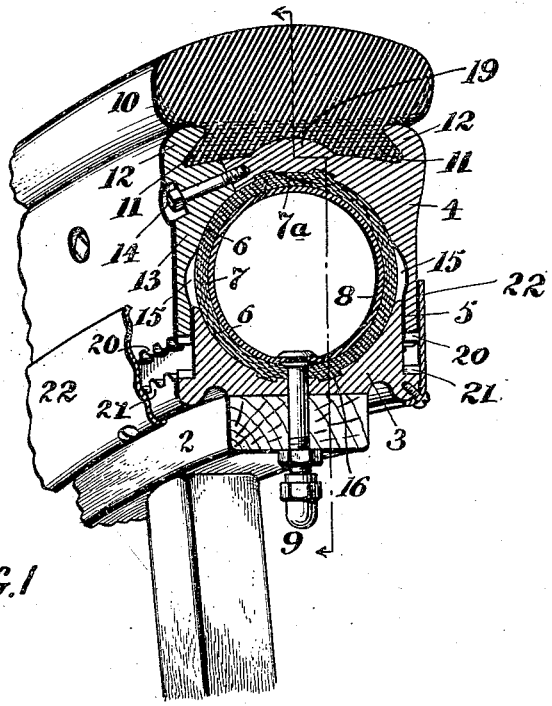
Figure 2:
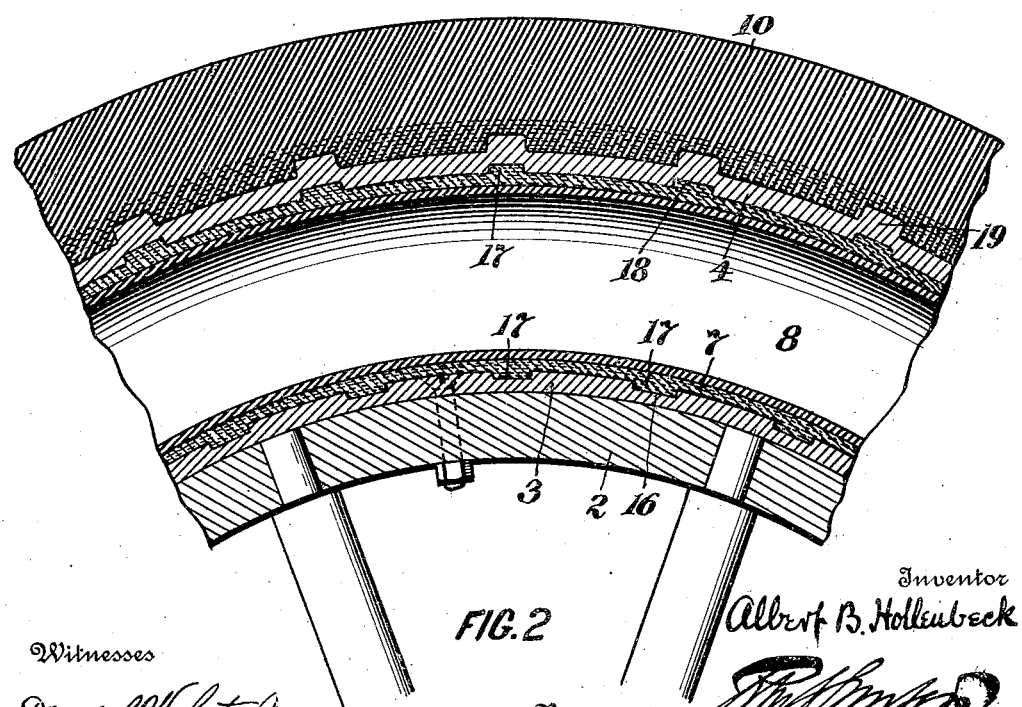

My invention also comprehends details of construction which, together with the features above specified, will be better understood by reference to the drawings, in which:

Figure 1 is a cross sectional perspective view of a wheel tire embodying my invention; and Fig. 2 is a sectional side elevation of the same.

2 is the wheel proper and may be made of wood, or of any of the constructions heretofore employed.

3 is a fixed metallic tire portion secured upon the felly of the wheel 2 and formed with an annular groove 6 forming almost a semi-circle in cross section.

4 is an outer or movable metallic tire portion and is annular in shape and provided on its inner surface with a groove 6 similar to the groove in the part 3 so that these two grooved portions provide an annular channel substantially circular in cross section in which is arranged the pneumatic tire 8 and its case 7. These metallic portions 3 and 4 have a sliding connection at 5 so that the outer portion 3 may adjust itself to the part 4 in the plane of the wheel to suit the load it may be required to carry; and reversely, the part 4 may adjust itself upon the part 3 to compensate for sudden impact to which it may be subjected in passing over obstructions or from collisions.

The inner tube 8 may be of any ordinary construction of pneumatic tire and provided with the pneumatic valve 9, by which it may be inflated.

The casing 7, which incloses the pneumatic tire, is formed of layers of rubber and fabric so as to be very strong and durable and provide great resistance against abrasive injury to the pneumatic tire. This case 7 is an annular envelop and split at the top on a diagonal so as to overlap at 7ª and is, moreover, preferably provided with projections 17 in annular rows adjacent upon its surface of smaller diameter which are received in corresponding recesses 16 in the grooved portion of the metallic part 2 of the tire. In this manner the case 7 is held against "creeping" during the rotation of the wheel in use. Similarly, the outer peripheral portion of the case adjacent to the overlapping edges 7ª are provided with upwardly directed lugs 17, which engage recesses 18 in the inner face of the groove 6 of the outer movable metallic tire portion 4, but in this case the object is to prevent the tire portion 4 "creeping" upon the pneumatic tire and case. It will be understood that while the lugs 17 coacting with the part 4 is desirable, they may be omitted.

The side flanges of the tire portion 4 are so shaped inside that they form annular side channels 15 upon each side of the shoe case 7 of the pneumatic tire to provide space into which the said parts may expand when the parts 3 and 4 are forced together when the wheel is in use. This is important because without such provision the pneumatic action of the tire would be destroyed.

The outer perimeter of the movable tire portion 4 is provided with the rubber shoe portion 10, which has the annular dove-tail portion 11 at the bottom and which engages the part 4 so as to be retained thereby. The tire portion 4 is provided with annular inwardly directed gripping flanges 12 which grip the dove-tailed portions of the rubber shoe and hold it in place. The part 4 may be provided about its perimeter between the ribs with a series of projections 19 which fit into recesses in the inner face of the rubber shoe to prevent the latter "creeping." To enable the rubber shoe to be inserted, the tire portion 4 may be made in two pieces, the part 13 being held in place by screws 14. It will be understood that the rubber shoe portion 10 may be formed and attached in any other way or may be omitted altogether and the outer perimeter of the part 4 used in its place for directly contacting with the ground.

In case the pneumatic tube 8 should become deflated from any cause, such as a leaky valve or from long usage and wearing out by lapse of time, it becomes necessary to make the outer tire portion 4 rotate with the inner part 3, to enable the chauffeur to get back to the garage or to a repair shop; and to insure this, I provide the tire portion 3 with teeth 21 upon each side and the portion 4 with teeth 20 upon the edge of each of its side portions, the said teeth acting as gears to engage each other during the rotation of the wheel. In this operation the teeth 21 and tire portion 3 act as a gear with external teeth and the tire part 4 and its teeth 20 act as a gear with internal teeth and partakes of a planetary motion because the pitch diameter of the teeth 20 is materially greater than the pitch diameter of the teeth 21. These teeth should be rounded on their ends so as to go into meshed engagement at any position when brought together, the outer part 4 taking a slight rotary adjustment automatically, if so required, to insure the engagement. Ordinarily the teeth 20 and 21 are far enough apart not to engage under any normal compression of the pneumatic tire portion and they may be protected against dirt by being shielded by annular plates 22 which are fastened preferably to the fixed tire part 3. Part of these shielding plates 22 are broken away in Fig. 1 to show the teeth.

The case which incloses the pneumatic tube 8 is preferably of rubber and fabric and hence, while flexible, is not expansible. Its lapped joint 7ª, while normally kept closed by the shape of the wall of the annular chamber formed in the outer part 4, is more positively maintained in close position by reason of the projecting lugs 16 engaging the recesses 18.

I have shown my invention in the form I prefer for commercial use, but I do not restrict myself to the details as these may be modified without departing from the spirit of the invention.

Having now described my invention, what I claim as new and desire to secure by Letters Patent, is:

In a wheel tire, the combination of two metal annular portions loosely sleeved together in the plane of the wheel and forming an annular chamber between them of normally circular cross section and the outer annular portion having lateral annular grooved portions curved in cross section to form lateral annular spaces, a pneumatic tube arranged in the annular chamber, and a separate protecting flexible but non-stretchable case inclosing the pneumatic tube and interposed between it and the walls of the annular chamber and adapted to spread laterally into the lateral annular grooved spaces when the pneumatic tube is compressed radially, said grooved spaces snugly receiving and supporting the case when spread laterally.

In testimony of which invention, I hereunto set my hand.

ALBERT B. HOLLENBECK.

Witnesses:
 WM. KEENER,
 B. T. TUTTLE.